US010369699B2

(12) United States Patent
Maisonnier et al.

(10) Patent No.: US 10,369,699 B2
(45) Date of Patent: Aug. 6, 2019

(54) EXECUTING SOFTWARE APPLICATIONS ON A ROBOT

(71) Applicant: SOFTBANK ROBOTICS EUROPE, Paris (FR)

(72) Inventors: Bruno Maisonnier, Paris (FR); Jérôme Monceaux, Paris (FR); David Houssin, Paris (FR); Gabriele Barbieri, Paris (FR); Taylor Veltrop, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 91 days.

(21) Appl. No.: 15/300,724

(22) PCT Filed: Apr. 17, 2015

(86) PCT No.: PCT/EP2015/058360
§ 371 (c)(1),
(2) Date: Sep. 29, 2016

(87) PCT Pub. No.: WO2015/158880
PCT Pub. Date: Oct. 22, 2015

(65) Prior Publication Data
US 2017/0106539 A1    Apr. 20, 2017

(30) Foreign Application Priority Data

Apr. 17, 2014 (EP) .................... 14305580

(51) Int. Cl.
*B25J 9/16*      (2006.01)
*G10L 15/18*    (2013.01)
(Continued)

(52) U.S. Cl.
CPC ............. *B25J 9/1694* (2013.01); *G10L 15/02* (2013.01); *G10L 15/1815* (2013.01);
(Continued)

(58) Field of Classification Search
CPC .... B25J 9/1694; G10L 25/51; G10L 15/1815; G10L 15/02; G10L 15/22; G10L 2015/223
(Continued)

(56) References Cited

U.S. PATENT DOCUMENTS 6,298,324 B1 * 10/2001 Zuberec .................. G10L 15/19
    704/251
6,427,063 B1 *  7/2002 Cook ....................... G09B 7/00
    434/118

(Continued)

FOREIGN PATENT DOCUMENTS

EP    2 367 130 A1    9/2011
WO    00/29936 A1    5/2000

OTHER PUBLICATIONS

A. Potamianos et al., "Information Seeking Spoken Dialogue Systems, Part II: Multimodal Dialogue," IEEE Transactions on Multimedia, vol. 9, No. 3, Apr. 1, 2007, pp. 550-566, XP011346399.

*Primary Examiner* — Jaime Figueroa
(74) *Attorney, Agent, or Firm* — Baker & Hostetler LLP

(57) ABSTRACT

A method of handling a software application on a robot comprising a plurality of installed software application, a software application being associated with a predefined semantic description, the method comprises the steps of extracting one or more patterns from an audio dialog with a human user; an audio dialog comprising sentences and a pattern comprising predefined sentences; comparing one or more patterns with the semantic descriptions of the software applications; selecting a software application based on the performed comparisons; and executing the selected software application. Described developments comprise software application execution rules, predefined or dynamically defined execution rules, the audio listing of the installed applications depending on environmental parameters, the (Continued)

optional use of complimentary display means and the installation of a missing application. Associated systems are described.

12 Claims, 2 Drawing Sheets

(51) Int. Cl.
  *G10L 15/02*   (2006.01)
  *G10L 15/22*   (2006.01)
  *G10L 25/51*   (2013.01)
(52) U.S. Cl.
  CPC .............. *G10L 15/22* (2013.01); *G10L 25/51* (2013.01); *G10L 2015/223* (2013.01)
(58) Field of Classification Search
  USPC ................................................. 700/245, 258
  See application file for complete search history.

(56) References Cited

U.S. PATENT DOCUMENTS

| | | | | |
|---|---|---|---|---|
| 9,195,233 | B2* | 11/2015 | Perrone | G05D 1/0088 |
| 9,833,901 | B2* | 12/2017 | Perrone | G05D 1/0088 |
| 2002/0123826 | A1* | 9/2002 | Toki | B25J 9/1658 |
| | | | | 700/245 |
| 2002/0173879 | A1* | 11/2002 | Sakamoto | B25J 9/1602 |
| | | | | 700/245 |
| 2005/0228882 | A1* | 10/2005 | Watanabe | H04M 3/42365 |
| | | | | 709/224 |
| 2007/0208442 | A1* | 9/2007 | Perrone | G05D 1/0088 |
| | | | | 700/95 |
| 2009/0082879 | A1* | 3/2009 | Dooley | B25J 9/1658 |
| | | | | 700/3 |
| 2011/0230211 | A1* | 9/2011 | Kim | G06F 21/71 |
| | | | | 455/456.4 |
| 2013/0031476 | A1* | 1/2013 | Coin | G06F 17/2881 |
| | | | | 715/706 |
| 2013/0226847 | A1* | 8/2013 | Cruse | G06N 5/02 |
| | | | | 706/12 |
| 2013/0325450 | A1* | 12/2013 | Levien | G10L 21/00 |
| | | | | 704/201 |
| 2014/0075352 | A1* | 3/2014 | Hansen | G06F 9/4451 |
| | | | | 715/765 |
| 2016/0221186 | A1* | 8/2016 | Perrone | B25J 9/1661 |
| 2017/0206064 | A1* | 7/2017 | Breazeal | G06F 8/34 |
| 2018/0095467 | A1* | 4/2018 | Perrone | G05D 1/0088 |

* cited by examiner

EXECUTING SOFTWARE APPLICATIONS ON A ROBOT

CROSS-REFERENCE TO RELATED APPLICATIONS

This application is a National Stage of International patent application PCT/EP2015/058360, filed on Apr. 17, 2015, which claims priority to foreign European patent application No. EP 14305580.4, filed on Apr 17, 2014, the disclosures of which are incorporated by reference in their entirety.

TECHNICAL FIELD

This patent relates to the field of digital data processing and more particularly to the handling of software applications in a companion humanoid robot.

BACKGROUND

On smartphones, personal computers or tablets, Graphical User Interfaces (GUI) represent the predominant mode of access to software applications. For example, a user can launch an application ("app") by selecting an icon on a touch screen and further interact with said application, for example by selecting or inputting data.

Voice commands are generally limited to specific contexts. For example, voice dictation software is mostly used in the context of a standalone software application (for example Word processing software). According to some accessibility features increasingly provided with modern operating systems, users can use voice commands to perform certain actions (for example launching an application, copy and paste, etc). These predefined actions are rather limited.

Such visual or audio interaction modes are generally passive (e.g. users are actively giving orders and the machine executes the orders). Even with recent computer interaction models, such as those implemented in answering systems for example, limited interactions occur from the machine to the user. Except a few core and predefined software applications like "Web Search" or "Calendar", answering systems (e.g. conversational agents) cannot launch a particular game software application.

In the context of a companion humanoid robot, the interaction model with human users significantly changes when compared with the interaction model with personal computers (and their different forms). The cognitive interaction with a robot is thus fundamentally different than the one with a tablet PC or a smartphone. For example and in particular, robots often lack graphical output means (e.g. companion robot may not embed a screen). This basic fact implies many consequences, in particular to appropriately discover, select and execute one or more software applications.

As robots may represent some day a platform of access to software applications,—if not someday the predominant one for many households—, and/or that computing may become so pervasive as to lower the display requirement up to zero, there is a need for methods and systems of handling software applications on devices with limited or without graphical user interface means, in particular in the specific context of a robot.

SUMMARY

There is disclosed a computer-implemented method of handling a software application on a robot, said robot comprising a plurality of installed software application, a software application being associated with a predefined semantic description, the method comprising the steps of extracting one or more patterns from an audio dialog with a human user; an audio dialog comprising sentences and a pattern comprising predefined sentences; comparing said one or more patterns with the semantic descriptions of said software applications; selecting a software application based on the performed comparisons; and executing the selected software application.

In a development, at least one installed software application is associated with one or more execution rules and the step of selecting a software application comprises verifying said one or more rules.

In a development, said one or more rules are predefined or are dynamically defined.

In a development, said one or more rules are locally retrievable on the robot or are remotely accessible via a network connection.

In a development, the audio dialog comprises a response by the user to a question raised by the robot.

In a development, the question is raised by the robot to disambiguate a sentence of the dialog or a pattern extracted from said dialog.

In a development, the dialog comprises a request by the user of the robot to pronounce a list of installed software applications.

In a development, the list to be pronounced by the robot is dependent on parameters associated with the perceived environment of the robot.

In a development, the parameters are selected from the group comprising the age of a user, the gender of a user, the height of a user, the number of users in the vicinity of the robot, the mood of a user, the presence or the absence of a smile of a user, the ambient audio level, the current date, the current time, the current location and combinations thereof.

In a development, the step of selecting a software application further comprises associating an execution probability value to each installed software application depending on said comparisons In a development, the method further comprises receiving the confirmation of the user before executing the selected software application.

In a development, the method further comprises displaying one or more representations associated with one or more of the installed software applications during the dialog with the user.

In a development, the method further comprises identifying a missing application in the robot, retrieving and installing said missing software application in the robot during the dialog with the user.

There is disclosed a computer program comprising instructions for carrying out one or more of the steps of the method when said computer program is executed on a suitable computer device or robotic device. There is disclosed a system comprising means adapted to carry out one or more of the steps of the method.

Advantageously, the man-machine interaction is active and no longer passive: the robot, from a human perspective, does take some initiatives (e.g. the robot does ask questions, for example for disambiguation purposes)

Advantageously, the conversational mode of interaction allows for an increased "expressivity" of the human user. The term "expressivity" refers to the fact that since the man-machine interaction is being (more) natural, the user communicates more data to the robot, which in turn can know and store more about the user, enriching further interactions in a virtuous circle. This is not true for a personal computer. A tablet may try to ask "questions", for example in the form of a quiz or questionnaire or by speech synthesis, but as the tablet is not considered as a "companion" which can (autonomously) move itself, displace objects or follow humans, a residual bias will remain. The amount of data which can be captured will be smaller when compared with a companion robot.

Information actively or passively gathered on a user (user profiling, user preferences), can be used as an input for launching conditions (e.g. an activity should only launch if the user loves "basketball"). Mechanism of machine learning: activities launched by the system can evolve depending on what is learned about the user.

BRIEF DESCRIPTION OF DRAWINGS

Embodiments of the present invention will now be described by way of example with reference to the accompanying drawings in which like references denote similar elements, and in which.

DETAILED DESCRIPTION

A software application, beyond the literal meaning (computer program code which when executed on a suitable computer device can perform one or more steps), can be or be associated with a dialog (e.g. a collection of predefined sentences, including responses to anticipated questions), an action (e.g. the execution of a dance or a physical action), an animation (e.g. movements of the head, activation of lightning's if any, etc) and combinations thereof (e.g a dialog while dancing). More generally, a software application can be a standalone application, with or without interactions or interaction capabilities with other applications. An example of a standalone software application is a weather application. Such an application can retrieve and restitute weather data.

Examples of applications comprise a weather application adapted to provide (e.g. by pronouncing or enunciating or restituting audio output) local weather conditions, a game application, a dance application, a storytelling application, etc. In particular, it is noticeable that a software application for a robot can lead to a set of physical actions of the robot (dancing, moving, seizing and displacing an object). A software application for a smart phone or a tablet generally does not comprise a real tangible action in the physical world.

Software applications can be interdependent. For example, because software applications can represent complex objects, there can be observed "transitions" between a priori distinct software applications. On a tablet computer, a weather software application provides meteorological data, while a drawing software application provides drawing tools. On a robot, it is conceivable that the robot accompanies the spoken result "it is −10° C. degrees outside" and/or draws a snowman on a piece of paper (and/or by symbolizing the outside cold by a combination of gestures). In other words, as a result of a multimodal output, software applications may be further combined (at the output levels or at lower levels, e.g. variables or parameters or scripts can be shared or modified between software applications).

Software applications advantageously can be presented to the user through a dialog interface, i.e. during the course of action of a ("natural") dialog with the user. In other words, the dialog system can act like a "bottleneck" for the user to be able to launch one or more applications. As discussed, in the case of the availability of graphical user interface means, the audio user interface means can be complemented or supplemented or corrected by the graphical user interface means.

Figure 1:
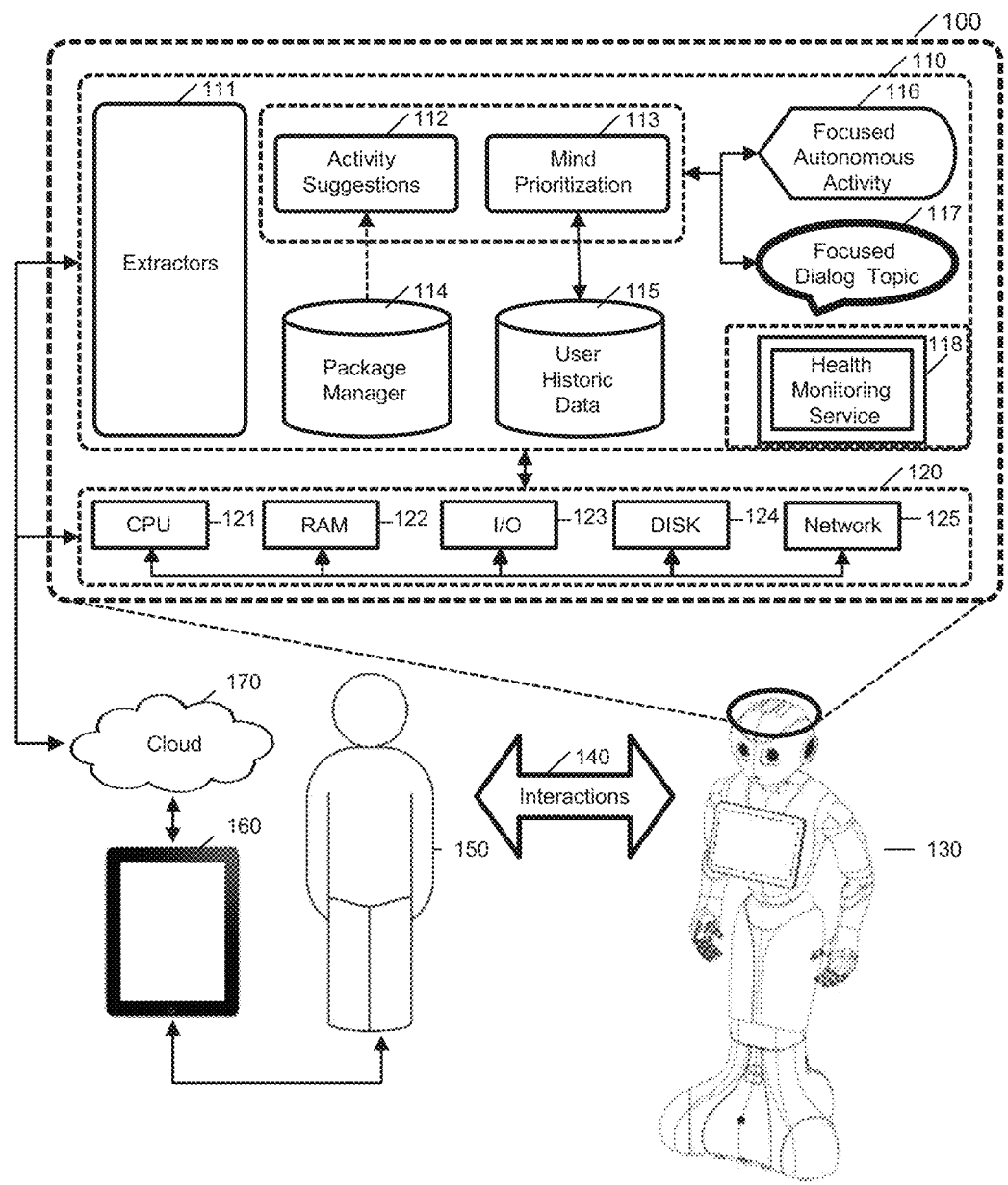
FIG. 1 illustrates the global technical environment of the invention.

The FIG. 1 illustrates the global and technical environment of the invention. A robot 130 comprises sensors and actuators. A logic or "mind" 100 is implemented in the robot or associated with it (for example remotely) and comprises a collection of software 110 and hardware components 120. The robot 130 is interacting (by bilateral or two-ways communications 140, including one or more dialog sessions) with one or more users 150. Said one or more users can access other computing devices 160 (for example a personal computer such as a wearable computer or a smartphone or a tablet), which can be connected devices (in communication with a cloud of servers and/or a fleet of other robots or connected objects, etc). In particular, a connected device can be a wearable computer (e.g. watch, glasses, immersive helmet, etc).

The specific robot 130 on the figure is taken as an example only of a humanoid robot in which the invention can be implemented. The lower limb of the robot on the figure is not functional for walking, but can move in any direction on its base which rolls on the surface on which it lays. The invention can be easily implemented in a robot which is fit for walking.

In some embodiments of the invention, the robot can comprise various kinds of sensors. Some of them are used to control the position and movements of the robot. This is the case, for instance, of an inertial unit, located in the torso of the robot, comprising a 3-axis gyrometer and a 3-axis accelerometer. The robot can also include two 2D color RGB cameras on the forehead of the robot (top and bottom). A 3D sensor can also be included behind the eyes of the robot. The robot can also optionally comprise laser lines generators, for instance in the head and in the base, so as to be able to sense its relative position to objects/beings in its environment. The robot can also include microphones to be capable of sensing sounds in its environment. The robot of the invention can also include sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route. To translate its emotions and communicate with human beings in its environment, the robot of the invention can also include LEDs, for instance in its eyes, ears and on its shoulders and loudspeakers (for example located in its ears). The robot can communicate with a base station, with other connected devices or with other robots through various networks (3G, 4G/LTE, Wifi, BLE, mesh, etc). The robot comprises a battery or source of energy. The robot can access a charging station fit for the type of battery that it includes. Position/movements of the robots are controlled by its motors, using algorithms which activate the chains defined by each limb and effectors defined at the end of each limb, in view of the measurements of the sensors.

In a specific embodiment, the robot can embed a tablet with which it can communicate messages (audio, video, web pages) to its environment, or receive entries from users through the tactile interface of the tablet. In another embodiment, the robot does not embed or present a screen but it does have a video projector, with which data or information can be projected on surfaces in the vicinity of the robot. Said surfaces can be flat (e.g. floor) or not (e.g. deformations of the projecting surfaces can be compensated to obtain a substantially flat projection). In both embodiments (with screen and/or with a projector), embodiments of the invention remain valid: the claimed interaction model is only supplemented or complemented by visual interaction means. In any case, would the graphical means be out of order or deactivated on purpose, the conversational mode of interaction remains.

In an embodiment, the robot does not comprise such graphical user interface means. Existing humanoid robots are generally provided with advanced speech capabilities but are generally not provided with GUI. Increasing communities of users will probably not use graphical means (e.g. tablet, smartphone), even as a complement, to communicate with the robot, by choice and/or necessity (young people, impaired persons, because of a practical situation, etc).

The collection of software 110 (non-exhaustively) comprises software modules or objects or software code parts, in interaction with one another, including "extractors" 111, "activity suggestions" 112, "mind prioritization" 113, "package manager" 114, "User historical data" 115, "Focused Autonomous activity" 116 and "Focused Dialog Topic" 117 and a "Health Monitoring Service" 118.

An "Extractor Service" 111 generally senses or perceives something internal or external of the robot and provides short term data into the robot's memory. An Extractor service receives input readings from the robot sensors; these sensor readings are preprocessed so as to extract relevant data in relation to the position of the robot, identification of objects/human beings in its environment, distance of said objects/human beings, words pronounced by human beings or emotions thereof. Extractor services in particular comprise: face recognition, people perception, engagement zones, waving detection, smile detection, gaze detection, emotion detection, voice analysis, speech recognition, sound localization, movement detection, panoramic compass, robot pose, robot health diagnosis, battery, QR code handling, home automation, tribes, time and schedule.

An "Actuator Service" makes the robot 130 physically do or perform actions. Motion tracker, LEDs, Behavior manager are examples of "Actuator Services".

A "Data Service" provides long-term stored data. Examples of Data Services are a User Session Service 115, which stores user data, and their history of what they have done with the robot and a Package Manager Service 114, which provides a scalable storage of procedures executed by the robot, with their high level definition, launch conditions and tags. "Package Manager" in particular provides the scalable storage of Activities and Dialogs, and the Manifest. The "Manifest" contains metadata such as launch conditions, tags, and high level descriptions.

A "Mind Service" (for example a service Mind Prioritization 113) is one that will be controlled by the robot's central "Mind" when it is initiating action. "Mind Services" tie together "Actuator services" 130, "Extractor services" 111 and "Data services" 115. Basic Awareness is a "Mind Service". It subscribes to "Extractor Services" such as People perception, Movement detection, and Sound localization to tell the Motion Service to move. The "Mind" 113 configures Basic Awareness's behavior based on the situation. At other times, Basic Awareness is either acting own its own, or is being configured by a Running Activity.

"Autonomous Life" is a Mind Service. It executes behavior activities. Based on the context of a situation, the Mind can tell autonomous life what activity to focus ("Focused Autonomous Activity" 116). Metadata in manifests tie this information into the mind. Any activity can have access to one or more of the Operating System APIs. Activities can also directly tell Autonomous Life what activity to focus, or tell the Dialog Service what topic to focus on.

The "Dialog" service can be configured as a Mind Service. It subscribes to the speech recognition extractor and can use "Animated Speech Actuator Service" to speak. Based on the context of a situation, the Mind can tell the Dialog what topics to focus on (a "Dialog Topic"). The "Dialog" service also has its algorithms for managing a conversation and is usually acting on its own. One component of the Dialog service can be a "Focused Dialog Topic" service 117. Dialog Topics can programmatically tell the Mind to switch focus to (or execute or launch) a different Activity or Dialog Topic, at any time. One example of possible method to determine the Dialog Topic can comprise: at the moment that an dialog topic or activity's launch conditions become true or false, a list of all possible Activities or Dialog Topics for the moment is sent to the Mind; the list is filtered according to activity prioritization; the list order is randomized; the list is sorted (or scored) to give precedence to Activities or Dialog Topics that are "unique" and have been started less often; a special check to make sure the top Dialog Topic or Activity in this list isn't the same activity as the previous activity that was executed. The list can be again sorted and filtered according to the preferences of the user.

The robot can implement a "health monitoring" service 118. Such a service can act as a daemon or a "watchdog", to review or control or regulate the different priorities of the robot. Such a service can monitor (continuously, intermittently or periodically) the status of the internal components of the robot and measure or anticipate or predict or correct hardware failures. In a development, the fleet (e.g. installed base) of robots is monitored. The embedded service can continuously detect faulty situations and synchronize them with a "cloud" service (once every minute for example).

Hardware components 120 comprise processing means 121, memory means 122, Input/Output I/O means 123, mass storage means 124 and network access means 125, said means interacting with one another (caching, swapping, distributed computing, load balancing, etc). The processing means 121 can be a CPU (multicore or manycore) or a FPGA. The memory means 122 comprise one or more of a flash memory or a random access memory. The I/O means 123 can comprise one or more of a screen (e.g. touch screen), a light or LED, a haptic feedback, a virtual keyboard, a mouse, a trackball, a joystick or a projector (including a laser projector). The storage means 124 can comprise one or more of a hard drive or a SSD. The network access means can provide access to one or more networks such as a 3G, 4G/LTE, Wifi, BLE or a mesh network. Network traffic can be encrypted (e.g. tunnel, SSL, etc).

In an embodiment, computing resources (calculations, memory, I/O means, storage and connectivity) can be remotely accessed, for example as a complement to local resources (available in the robot itself). For example, further CPU units can be accessed through the Cloud for voice recognition computing tasks. Computing resources also can be shared. In particular, a plurality of robots can share resources. Connected devices in the vicinity of the robot also can share resources to some extent, for example via secured protocols. Display means also can be shared. For example, the television can be used as a further display by the robot when passing by.

Figure 2:
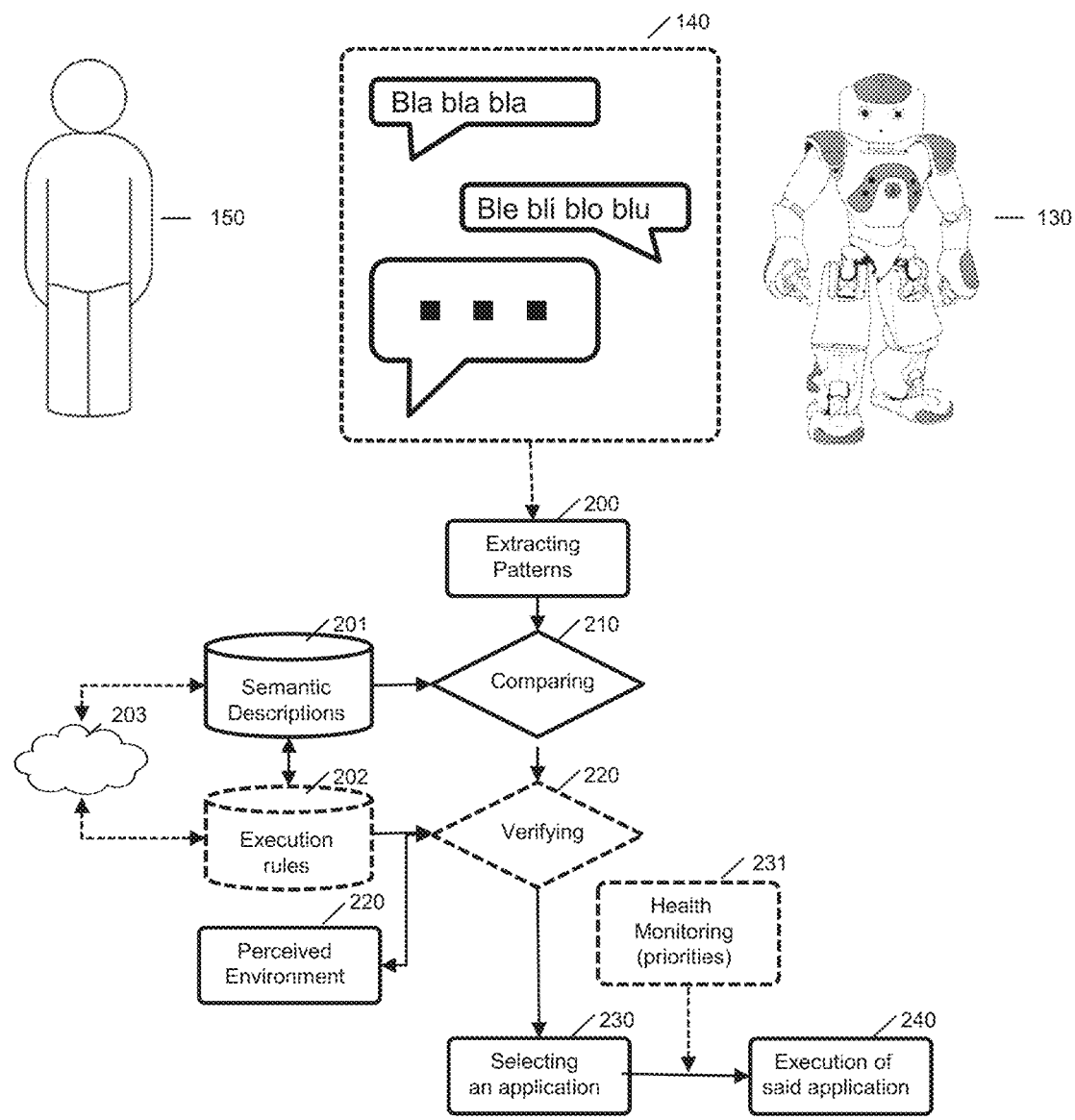
FIG. 2 details some aspects of an embodiment of the method.

The FIG. 2 details some aspects of an embodiment of the method There are several ways to trigger the launch or execution of an application during a dialog 140 comprising sentences between a human user 150 and a robot 130. One or more dialog patterns are extracted 200 during the dialog and further compared 210 with one or more semantic descriptions associated with one or more software applications 201 and one or more execution rules 202, which are in turn tested. If verified 220 (for example in view of the perceived environment by the robot with its sensors), one or more software applications are selected. Further optional criteria like those derived from the health monitoring watchdog 231 can rearrange execution priorities (or probabilities). As a result, one or more software applications are executed at step 240.

These different ways (in particular described hereinafter) to trigger the launch or execution of one or more software applications are independent and can be further combined with one another. Overall, software applications can be executed depending on launching conditions or parameters. These conditions or parameters can be facts 201 or rules 202 or both (rules on facts). These facts 201 for example comprise the type or category of user, the current context or situation or environment, characterized by one or more environment values (e.g. current local weather, date and time, emotions detected, number of users, etc). The rules 202 range from simple to complex rules. The rules can be conditional. For example in an embodiment, a plurality of rules has to be simultaneously satisfied in other to authorize or allow the execution of an application. In another embodiment, a plurality of rules has to be sequentially satisfied (for example in a certain order and/or with time limits or thresholds). Some rules can be predefined. Some other rules can be dynamically defined (for example, some rules can be retrieved from the Internet).

As a regulation of the execution of applications, the health monitoring service 231 of the robot can adjust execution priorities 231. In particular, the execution of applications can take into account such a "health monitoring" service. In other words, priority schemes can further regulate the execution of software applications. In an embodiment, the robot is not in interaction with a user (i.e. is interacting with nobody). In such a case, the robot performs or can perform autonomous tasks. In another embodiment, the robot is in danger (e.g. "safeguard mode", battery level low or critical, presence of an obstacle or risk of falling, etc). In such a case, the priority of the robot is to handle and solve its own issues (e.g. to perform its own tasks). For example, if the battery level is critical, the robots can interrupt dialog with a user and try to reach the energy source base. The dialog interaction module can be activated if the user is detected in the vicinity and/or if the robot is not in a critical situation (in which the robots could not execute its basic functions). To the opposite, the dialog interaction module can be deactivated if no user is detected in the vicinity and/or the robot is in a critical situation.

Some specific contexts of the execution of an application are now described.

In an embodiment, one or more applications are executed during a dialog, triggered by the fulfillment (or verification or satisfaction) 220 of one or more execution conditions. A dialog between man and machine is monitored and "patterns" are (for example) continuously extracted 200 from the dialog flow 140 ("collaborative dialog" mode). In an embodiment, the speech flow is received and continuously analyzed. The extraction goes beyond the mere extraction of voice commands (e.g. key expressions) in a speech flow with or without a marker ("OK Glass, take a picture"), In particular, words or expressions of the user are extracted and compared or matched 210 against one or more semantic descriptions 201 of software applications.

Each software application can come in some embodiments with a software program, as semantic description 201 and contextual launch or execution rules 202. The semantic description 201 is generally provided by the software application editor or publisher. These semantic descriptions in particular can comprise one or more pre-fabricated dialogs, around the considered software application. These dialogs in particular comprise variations around the software application. For example, instead of its mere commercial name, the game application may be known as "the game with birds and green pigs" or "the game in which you have to throw birds against targets" and the like. These meta-descriptions composed of sentences and validation around these sentences are provided in structured dialogs 201. The packaging into a dialog form enables to parse combinatorial trees and to clarify ambiguities. For example, if the user asks "I would like to play with the birds", the robot can further ask "do you want to play with real birds or with virtual birds?". If the user responds "with virtual birds", the robot can ask for confirmation "so you want to play a game?!". If the user responds "yes", the robot can still further ask confirmation, for example "I have a game in which you have to throw birds against green pigs".

Using a dialog with the robot enables a specific, different and advantageous access to a specific software module. In a tablet or a PC, applications are not provided with a semantic description and in presence of display capabilities, applications are equally accessible on the device. The user has to swipe screen in order to identify the right desired application. If the user cannot remember the logo and/or some description of the application, there are no particular ways to retrieve one application among possibly many software applications. To the contrary, the disclosed mode of access to software, via and during a conversation, effectively enables to "data mine" available applications. The mode is more natural to some extent and can compensate for the lack of display means. One remarkable characteristics of the mode is related to the nature of the interaction: a dialog enables to deal with complex or unclear or insufficient queries. In case of insufficient information, the conversation predefined in the description associated with the software application enables to fill in the gaps and to rapidly converge to the identification of a precise software application. This mode can be named the "collaborative dialog"

In another embodiment, one or more launching conditions or execution rules 202 are predefined. The software application is provided by the editor or publisher with a file comprising a list of conditions and/or rules to be able or allow or to authorize the launch of said software application. Execution rules are tested: if they are satisfied or allowed or verified 220, one or more software application can be selected. Some rules may be the minimal criteria to fulfill. Some other rules time can define preferred launch conditions. For example, a minimal rule may be "if user is aged below 12 and it is before 22 pm, launch is authorized", a preferred rule can be "if three users are located within 5 m, and at least two users are aged under 12, and at least one is smiling and if no other counter indications, then propose a dance". In other words, applications can self define their preferred launching conditions.

Execution rules and/or semantic description can be accessed through a network or be accessed locally. In some embodiments, they are complemented or supplemented by accesses to networks and knowledge bases.

In an embodiment, the launch or execution of one or more software applications is triggered during a dialog with a user (interaction with the user). Specifically, one or more words pronounced by the user and captured and recognized by the robot do lead to the triggering of said execution. A predefined weather application is installed on the robot, and said application is associated with a collaborative dialog. The collaborative dialog comprises one or more patterns which are extracted 200, for example "weather, please", "give me the weather", "what is the weather", "what is the weather in ~ city", "is it sunny outside?", "do I need warm clothes", "is it going to rain tomorrow". During a dialog, the user asks the robot "how is the weather today". The audio signal is captured, optionally filtered and enhanced, a speech-to-text operation is performed (locally on the robot and/or remotely on the cloud), the obtained text is analyzed and one or more comparisons are performed with said patterns. Upon one or more matches, optionally with thresholds, a software application is selected among those installed on the robot. The selected software application is further executed. In practice, for example, the robot thus can launch the weather application and provide the requested information.

In a development, the audio "listing" operation of the different installed software applications is context dependent, i.e. dependent on a collection of rules (i.e. at least partly driven by the current context). Below is an example. The user asks "what can you do". The robot interprets the visual perception and detects a child. Audio recognition and/or face recognition determine that the child has never played chess with the robot. The robot proposes "we can play chess together". For example, the corresponding pattern will be like {proposal:[~game "$people/age>10~information"]}. If the user for example responds "yes, great", the robots can interpret the response as a confirmation pattern, and in turn launch or execute the corresponding software application. With some predefined rules (e.g. time of the day, smiling user or not, etc) the robot can proactively propose to take a picture; upon confirmation by the user, the robot actually triggers the camera.

These examples illustrate the fact that more complex rules can be predefined in order to govern the behavior of the robot. Typically, a game application can be proposed to anybody, while applications categorized in "information" category can be proposed to adults only. In other words, as a fact, users can be categorized in groups. Based on such facts, rules can be defined: software applications can be associated with corresponding execution rules. For example, in an embodiment, the proposal of an application by the robot can be driven by a predefined (e.g. anticipated) environment. For example, the developer of an application can add a "proactive collaborative dialog" for the weather application (in the form of {proposal: $Dialog/Weather/SoonRain=True "you may want to take an umbrella with you today"). This rule will determine that if the weather application indicates that rain is about to come, the robot may warn the user accordingly. With a rule for telling a story that reads {proposal: $people/age<10 "do you want me to tell you a story?"; u1:(~confirmation) ^switchFocus(AliceInWonderland), if the user is determined to be in the right age group, a received confirmation in a topic "story" will be automatic be switched to a predefined story type.

In an specific embodiment, the user actively can ask the robot to list the different installed software applications ("audio listing" of available software applications). In practice, the developer of the application adds or installs a weather application, annotated (e.g. metadata) or categorized "information", and that chess game application, annotated (e.g. metadata) or categorized "game". Upon the user asking a question such as "what can you do?", the robot can answer "I have information and games". If the user asks "I would like information", the robot can interpret the dialog sentence as corresponding to the pattern ("I would like ~ applications"). The robot then can answer "I can give you weather information". If the user responds "all right", the robot interprets the sentence as a confirmation pattern. The robot in the end provides the requested information.

In an embodiment, the robot can list the different applications available per category (productivity, game, etc). The user can interrupt at any time and or asked for more details (including prices, reviews, etc). In an embodiment, for example in response to a user query, the robot can list applications available per theme or topic. For example the user can ask "do you have some games" and the robot can respond "yes I have two games, chess and angry birds". Subpart of the tree can be parsed is necessary. For example once the user has declared "I do not like games", then the corresponding category can be skipped. In other words the user profiling resulting from the accumulation of data about said user can be advantageously leveraged to better orient or focus interactions. In another embodiment, the robot can pro actively propose or initiate to browse the list of available or installed software applications. In such a case, the robot enunciates the different names of software applications, more or less rapidly, for example by a alphabetical order, by software applications category (productivity, game, health utilities etc). In a development, such a proposition can occur during a dialog with said user.

Several aspects of the invention are now discussed

Regarding the regulation of the execution of software applications, competition laws generally impose fair and not discriminatory practices. For example, on personal computers, when setting up new browser application, the user has to be given the choice between several options. It can be anticipated that similar requirements will be observed for robotic platforms. Be it for standalone software or for Web services, the general software framework of the robot may and probably will be faced with several software alternatives. For example, when in need of an email client, the robot platform will have the choice between and open source alternative and proprietary alternative. With respect to web services, such choices may occur regularly during the day (choice of deprecated API, etc). General guidelines can be defined on the software panel associated with the robot. In an embodiment, a reasonable number of such choices can be presented to the user "do you want to use Google API or Bing API?", this RSS feed or this RSS feed ?_In the case of several software applications competing in the same field, or at least with some overlap between activities, some regulation can occur. First, the operator of the robotic platform can ensure that the quality of experience of the user is preserved. For example, an independent watchdog or monitoring daemon can watch and limit the number of overall solicitations received per user. Based on statistics on software applications usages (number of downloads, number of launches, number of interactions with software applications) and/or software applications financial aspects (commissions, editor' picks, etc) and/or software applications quality metrics (consumer reviews, ratings, including statistical data and/or locally measurement feedbacks), launching conditions can be moderated. In practice, thresholds and parameters weigh in the launching conditions a priori declared by software applications providers.

Regarding the "on demand" mode of retrieval and installation of software applications, a "software application" according the described embodiments is generally installed or pre-installed (i.e. the software code is downloaded and ready for installation on the device). In a further embodiment, a software application also can be potentially installed or virtually installed or listed as a candidate for installation. In other words, the decision logic of the robot can determine at certain moments that complimentary software application can be needed or even required. In an embodiment, application requirements can be defined (e.g. a weather software application providing values in Fahrenheit degrees), said that requirements can sent to the cloud or a central server comprising inventories of software applications (certified or not, in alpha, in beta, etc), and upon one or more matches between said requirements and available software applications, one or more corresponding software applications can be downloaded and further installed on the robot. As the latter steps can be fast, such "on demand" reconfigurations can be transparent for the user.

Regarding visual interfaces versus audio dialog interfaces, a scenario in which no display means are available to guide or assist the user in his interaction with the robot might be a "must-have" mode of interaction, that is the most probable situation to happen in the future (elderly, impaired person, natural and straightforward interactions, etc). Nevertheless, a future crowded with screens everywhere is also plausible (on the walls, cheap screens on tables, everyday objects, etc). In this case there are no contradictions with the disclosed embodiments: interaction modes are at least complimentary (audio dialog mode and opportunistic GUI). For example, in case of one or more display means accessible in the vicinity of the robot (for example a connected television adapted to receive and display information when passing by or a tablet which can be reached by the robot or a watch or car windshirm, etc), at least some relevant portions of the user interface can be opportunistically displayed to the user to fasten choices. In other words, if visual means can be fully avoided to interact with the robot, a contrario the accessibility to some display means can be leveraged to complement or enrich the user experience. In some embodiments, the robot can be provided without display means (touch screens located on the torso for example) or embed a projectors or pico-projectors (for example located in the head and/or in the hand), so that to be able to display anywhere and on demand—at least the appropriate portions of—a GUI. Graphical UI and non-graphical user interface thus can be combined.

Closed-loop versus open-loop embodiments can be discussed. In an embodiment, the launch of an application is fully automatic, i.e. without the consent or the confirmation of the user. In a development, a user or super-user (parent) can interrupt or suspend or terminate or end the execution of an application. In another embodiment, the launch of an application requires an explicit confirmation by the user. The robot can declare its intention to launch a certain application, but will wait for the confirmation before continuing. For the example, the robot can declare "I propose to give you the weather conditions" and the user still can reply "not now". In an embodiment, in response to the reception of the voice command "give me the weather", the operating system of the robot can suspend the execution of the current task and launch/execute the specific software application; after termination, the current task can be resumed.

The disclosed methods can take form of an entirely hardware embodiment (e.g. FPGA), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A method of handling a software application on a humanoid robot, said robot comprising a plurality of installed software applications, a software application being associated with a predefined semantic description, the method comprising the steps of:
   extracting one or more patterns from an audio dialog with a human user, an audio dialog comprising sentences and a pattern comprising predefined sentences;
   comparing said one or more patterns with the semantic descriptions of said software applications, the semantic descriptions comprising one or more pre-fabricated dialogs associated with a software application, said pre-fabricated dialogs comprising variations describing the software application;
   selecting a software application based on the performed comparisons;
   executing the selected software application, wherein
   at least one installed software application is associated with one or more execution rules and the step of selecting a software application comprises verifying said one or more rules;
   the humanoid robot does not comprise a graphical user interface,
   the dialog comprises a request by the user of the robot to pronounce a list of installed software applications, and
   the list to be pronounced by the robot is dependent on parameters associated with the perceived environment of the robot.

2. The method of claim 1, wherein said one or more rules are predefined or are dynamically defined.

3. The method of claim 1, wherein said one or more rules are locally retrievable on the robot or are remotely accessible via a network connection.

4. The method of claim 1, wherein the audio dialog comprises a response by the user to a question raised by the robot.

5. The method of claim 4, wherein the question is raised by the robot to disambiguate a sentence of the dialog or a pattern extracted from said dialog.

6. The method of claim 1, wherein the parameters are selected from the group comprising the age of a user, the gender of a user, the height of a user, the number of users in the vicinity of the robot, the mood of a user, the presence or the absence of a smile of a user, the ambient audio level, the current date, the current time, the current location and combinations thereof.

7. The method of claim 1, wherein the step of selecting a software application further comprises associating an execution probability value to each installed software application depending on said comparisons.

8. The method of claim 1, further comprising receiving the confirmation of the user before executing the selected software application.

9. The method of claim 1, further comprising displaying one or more representations associated with one or more of the installed software applications during the dialog with the user.

10. The method of claim 1, further comprising identifying a missing application in the robot, retrieving and installing said missing software application in the robot during the dialog with the user.

11. A non-transitory computer readable medium comprising instructions that when executed by a suitable computer device cause the computer device to automatically perform the steps of the method according to claim 1.

12. A system comprising means adapted to carry out the steps of the method according to claim 1.

* * * * *